United States Patent

[11] 3,613,657

[72] Inventors John E. Wilska
840 Amostown Road, West Springfield;
Harold F. Felix, 51 Irving St., West Springfield; John A. Dialessi, 267 Kings Hwy., West Springfield, Mass. 01089; Fred C. Emerson, Old Main Road, Worthington, Mass. 01098
[21] Appl. No. 880,095
[22] Filed Nov. 26, 1969
[45] Patented Oct. 19, 1971

[54] OUTDOOR COOKER WITH REUSABLE CARTRIDGE-TYPE GRILL UNIT
3 Claims, 4 Drawing Figs.
[52] U.S. Cl. .................................................. 126/41 R
[51] Int. Cl. ............................................. A47j 37/00, F24c 3/04
[50] Field of Search ........................................... 126/41, 9, 25, 25 A

[56] References Cited
UNITED STATES PATENTS

| | | | |
|---|---|---|---|
| 2,790,434 | 4/1957 | Del Francia ................. | 126/41 |
| 2,898,846 | 8/1959 | Del Francia ................. | 126/41 X |
| 2,981,249 | 4/1961 | Russell et al. ................ | 126/25 |
| 3,103,160 | 9/1963 | Forniti et al. ................ | 126/41 X |
| 3,386,432 | 6/1968 | Hanson ....................... | 126/41 |
| 3,474,724 | 10/1969 | Jenn ............................ | 126/41 X |

Primary Examiner—Charles J. Myhre
Attorney—Chapin, Neal and Dempsey

ABSTRACT: A portable outdoor cooking unit having a gas-fired burner element in the lower section of a container housing body with a cooking grill cartridge pack removably mounted in the upper section thereof, the pack being formed as a composite reusable grill unit having a lower panel or layer of noncombustible briquets secured between open metalwork members and a cooking grill surface supported in elevated relation thereto.

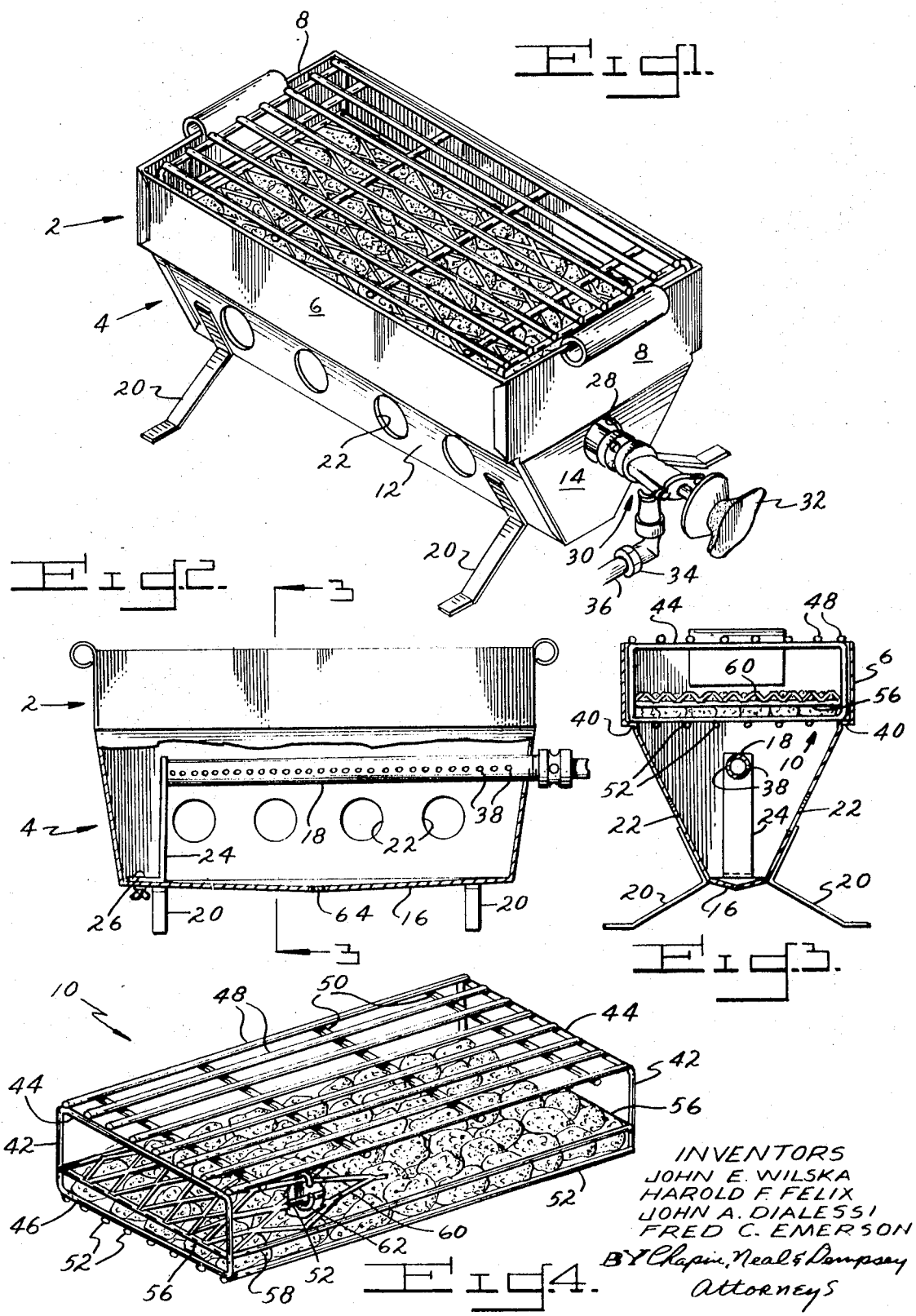

OUTDOOR COOKER WITH REUSABLE CARTRIDGE-TYPE GRILL UNIT

BACKGROUND

This invention relates to outdoor cooking grill units and particularly to units which are suitable for such use where a source of gas, such as the well-known "bottled" gas, is available for connection to a burner element of the device.

The device of the invention is especially adapted as a convenient item of equipment to be used as a substitute for the usual outdoor charcoal grill and most advantageously in connection with automotive "campers" or camping trailers which are outfitted with various types of refrigerating, heating, and cooking equipment commonly fueled as, for example, by bottled-gas cylinders. The device of the present invention incorporates in a hand-portable burner housing containing a gas-fired burner element as a source of heat, a self-contained cooking grill unit having a "sandwiched" lower layer of noncombustible briquets arrayed as a briquet panel and a cooking grill surface supported in elevated relation above the bed of briquets. This "packaged" unit may be removably dropped into place in the housing after the manner of a cartridge pack and reused many times over for a relatively long period before the need for replacement with a similar cartridge pack, all without problems of ash disposal or more than a minimum amount of care to maintain cleanliness.

Prior art disposable barbecue boxes or containers of various types using consumable briquets are well known, as are various types of burner apparatus employing gas-fueled burner elements for the purpose of starting a charcoal fire or heating nonconsumable chips or coals. Insofar as is known, however, no prior devices have utilized a reusable cartridge-type of cooking grill unit in which a secured layer or panel of noncombustible coals is disposed below a cooking grill surface, the self-contained "pack" being insertable in a burner housing for repeated usage. The principal objects of the invention are thus to provide a barbecue device having a self-contained cooking grill unit eliminating ash disposal problems and one which may be reused repeatedly and may be readily and easily kept in clean condition.

The above and other advantages and features of the invention will be apparent from the following description of an embodiment thereof as shown in the accompanying drawings.

In the drawings,

FIG. 1 is a perspective view of an assembled outdoor grill unit embodying the invention;

FIG. 2 is a side elevational view thereof with the side wall cut away to show the burner element in the lower section of the housing;

FIG. 3 is a sectional view on line 3—3 of FIG. 2; and

FIG. 4 is a perspective view of the reusable cooker grill cartridge pack as removed from the assembly of FIGS. 1 and 3.

The assembled unit as shown by the drawings comprises a portable open-top container body or housing having upper and lower sections indicated at 2 and 4 respectively. The upper section has vertical sidewalls 6 and vertical end walls 8 removably supporting therein a reusable cooker grill cartridge pack 10 (see FIG. 4). The lower section is preferably formed with inwardly angled sidewalls 10, end walls 14, and a bottom wall 16 and contains a burner element 18 mounted therein. Supporting legs 20 are formed from metal iron pieces which may be suitable fixed to the sidewalls or bottom as by welding or otherwise.

Air vent openings 22 are provided in sidewalls 12 and supported centrally of the lower section 4 in spaced relation below the cartridge pack 10 is the gas-fired burner tube element 18. At its terminal end the tube is suitably fixed on an upstanding metal iron support 24 which may be removably fastened to the bottom wall as at 26. At its inlet end the tube extends loosely through an opening 28 in end wall 14. Outwardly of the end wall are located inlet burner control means, generally indicated by the numeral 30. The control means need not be further described as this type of mechanism is well known. It is adapted to regulate the burner for high, low, medium, etc. firing rates, an actuating knob being shown at 32. An inlet connection to the tube is indicated by connector fitting 34 to which may be connected a line 36 from any suitable fuel source as a supply of "bottled" gas.

The relative positioning of the burner firing tube with respect to the underside of the grill cartridge 10 is best shown by FIG. 3. As will be appreciated, a series of aligned burner flame openings 38 may be located along each side of the tube so that the flames will be effectively spread out and provide an evenly distributed source of fire for heating the layer or panel of briquets of the grill cartridge. As will also be seen by FIG. 3, the means for positioning the grill cartridge above the tube and in the upper section 2 of the container housing is provided by inwardly directed shoulders 40 at the lower edges of the sidewalls 6 thus seating the cartridge pack in the assembly.

Referring now to FIG. 4, a preferred form of reusable cartridge pack unit is shown. At each end of the unit are rectangular end frame members which may be formed as by bending suitable relatively heavy wire rod or bar stock thus providing upstanding support legs 42 and upper and lower end cross supports 44 and 46 respectively. Affixed to the upper supports 44 of these end frames are a series of cooking grill rods 48 which may be suitably reinforced by additional cross rods 50. The lower end supports 44 of the end frames are preferably likewise joined by rods indicated at 52, these lower rods which may also be reinforced by cross rods (not shown) thus form as will be readily apparent a lower member for supporting a layer of briquets. In spaced relation above the lower supporting member and fastened at its corners to the legs 42, as by welding, is a rectangular frame with end and side bars 56 and 58. Welded to the frame bars are edge portions of a rectangular section of expanded metal 60 or other suitable welded wire fabric for covering the upper surfaces of the briquets and securing them in the substantially snug panel arrangement as shown. With the frame bars 56 and 58 the expanded metal or a welded wire fabric forms an upper open metalwork member which may be suitably bent to lie against the irregular upper surface of the briquets and thus effectively hold the individual pieces against excessive shifting movement in the assembly. For further reinforcing purposes the upper and lower members may be hooked together at random locations by clips as indicated at 62 engaging one of the webs or strands of the expanded metal or fabric and a lower rod 52. The briquets may be formed of suitable nonconsumable coals having a suitable degree of heat retention such as chunks of lava stone or the like. Such stones may be used and reused over a relatively long period of time, and if excessively covered by deposits of grease etc., may be readily cleaned as by washing with an ordinary household detergent.

It will be appreciated from the assembly as shown that in use the cooking of various meats etc. may be readily and suitably controlled by heating the panel of briquets to the desired degree. Dripping of juices from various kinds of meat will often strike the heated briquets and burn off. The briquets being noncombustible will in effect throw back the vapors etc. of the drippings so as to react favorably and assist in the process of cooking the meats and other foods. When excessive dripping occurs and/or juices otherwise fall through the coals and drip into the lower section an accumulation of juices will be drained off through a center opening at 64 of the bottom wall 16 (FIG. 2), this wall as shown being slightly dished for this purpose. After use, it will further be seen that by removing the grill pack 10, and also the burner unit if desired, from the assembly the interior walls of the housing are readily accessible for cleaning purposes. The separability of the grill pack 10 also makes it easy and convenient for wiping and cleaning off the rods of the cooking grill surface and, as above mentioned, also washing the lava stone chunks if necessary.

What is claimed is:

1. A hand-portable outdoor grill unit comprising,
    an open-top container body having side and bottom walls,
        the upper section of said sidewalls being vertically disposed, a reusable cooking grill cartridge pack and means for positioning the pack in the upper section of said body, said pack comprising a layer of noncombustible briquets arranged in substantially flat panel form having a pair of open metalwork members holding said briquets sandwiched therebetween, and an upper cooking grill surface held in elevated relation to said briquets, a pair of rectangularly shaped bars providing end frames for said pack having rods connected between the upper bar portions of the frames to form said cooking grill surface and rods connected between the lower bar portions of the frames to form the lower of said pair of briquet-holding members, the upstanding legs of said frames supporting said grill surface in spaced relation above the layer of briquets, said lower section of the body having a gas-fired burner element mounted centrally in spaced relation below said cartridge pack with a burner inlet extending outwardly of the body and having control means and a fuel source connector means.

2. A unit as in claim 1 in which the upstanding legs of the end frames are interconnected by a rectangular frame bar in closely spaced relation above the said lower briquet-holding member, and a rectangular section of expanded metal is affixed at edge portions thereof to said frame bar thereby forming the upper of said pair of briquet-holding members, said expanded metal having the strands thereof bent down against the upper surfaces of said briquets.

3. A unit as in claim 2 in which, said panel of briquets is formed by a plurality of chunks of lava stone.